Figure 1:
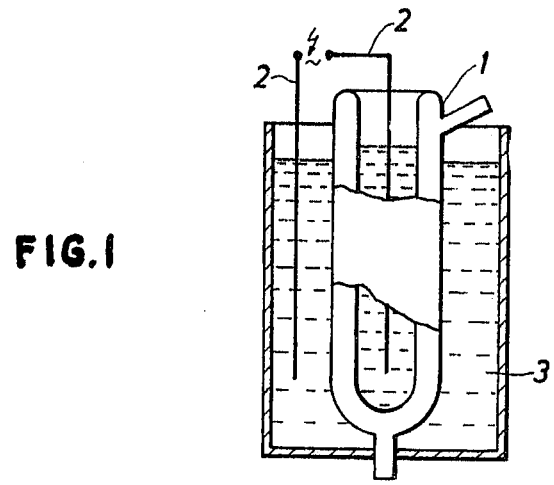

United States Patent

[11] 3,625,847

[72] Inventor  Roland Weisbeck
　　　　　　　Volswinkel, Germany
[21] Appl. No. 61,130
[22] Filed Aug. 5, 1970
[45] Patented Dec. 7, 1971
[73] Assignee Farbenfabriken Bayer Aktiengesellschaft
　　　　　　　Leverkusen, Germany
[32] Priority Aug. 14, 1969
[33] Germany
[31] P 19 41 378.6

[54] DIRECT OXIDATION OF PROPYLENE TO PROPYLENE OXIDE
14 Claims, 2 Drawing Figs.

[52] U.S. Cl. .................................... 204/169,
　　　　　　　　　　　　　　　　　204/323, 260/348.5
[51] Int. Cl. ........................................... C07d 1/08,
　　　　　　　　　　　　　　　　　C07b 29/06, B01k 1/00
[50] Field of Search ............................................ 204/80,
　　　　　　　　　　　　　　　　　169, 168; 260/348.5

[56] References Cited
UNITED STATES PATENTS
3,475,308  10/1969  Burlson et al. ................. 204/169

3,497,431  2/1970  Kronig et al. .................. 204/80

FOREIGN PATENTS
654,279  12/1962  Canada ........................ 260/348.5
718,603  11/1954  Great Britain ................ 260/348.5
5,847    1969    Japan ..........................
5,849    1969    Japan ..........................

Primary Examiner—F. C. Edmundson
Attorney—Burgess, Dinklage & Sprung

ABSTRACT: Process for the direct oxidation of propylene to propylene oxide, comprising establishing an alternating electric current gas discharge in a circuit including a gap bounded on at least one side with a material of high-dielectric constant, the voltage being of such magnitude that a gas discharge plasma is established across said zone, continuously supplying to said gap a gaseous mixture of propylene and an oxygen-containing gas, and continuously withdrawing from said gap a gaseous mixture containing propylene oxide. The gap may be defined by two coaxial glass tubes. By use of particular frequencies and voltages and by inclusion of resistances and inductances in the circuit high yields and conversions can be achieved.

INVENTOR.
ROLAND WEISBECK
BY
Burgess, Dinklage & Sprung

DIRECT OXIDATION OF PROPYLENE TO PROPYLENE OXIDE

The present invention relates to a new process for the direct oxidation of propylene to propylene 1,2-oxide in a cold or nonequilibrium plasma of a so-called silent electric gas discharge, which constitutes a particular form of corona gas discharge.

The large-scale production of propylene oxide from propylene for years has generally been carried out by the chlorhydrin process, which is based upon a complicated principle and has a number of unpleasant consequences.

It is accordingly an object of the present invention to provide a single step process for the direct oxidation of propylene to propylene oxide using an oxygen-containing gas.

This and other objects are realized in accordance with the invention wherein a direct oxidation of propylene to propylene-1,2-oxide is effected by feeding a gaseous mixture of propylene and a gas containing oxygen in free or combined form to an electric alternating current gas discharge, the propylene-1,2-oxide being continuously withdrawn from the chamber in which discharge takes place. The discharge is of such nature that the alternating electric field is applied in a direction perpendicular to the direction of flow of the gas mixture and the gas discharge is electrically in series with a dielectric having a high dielectric constant and comes into contact with the gas discharge plasma of this dielectric at least on one side as seen in the direction of the electric field.

The particular advantages of the process of the invention reside in that the process can be performed in a relatively simple manner, i.e. the gas mixture can rapidly flow through the reactor under normal pressure, and is cheap, with relatively high selectivity of the oxidation to give the desired product.

A further advantage of the process of the invention resides in that, under the discharge conditions chosen, there are produced only vaporous reaction products and liquid reaction products of low viscosity, but no solids which may influence the gas discharge and clog the reactor.

For carrying out the process, there is employed a discharge reactor comprising, for example, two coaxial tubes, at least one of which is made of an electrically insulating material. There may also be employed reactors which comprise, for example, two spaced parallel plates, at least one of which is an electrical insulator.

Figure 2:
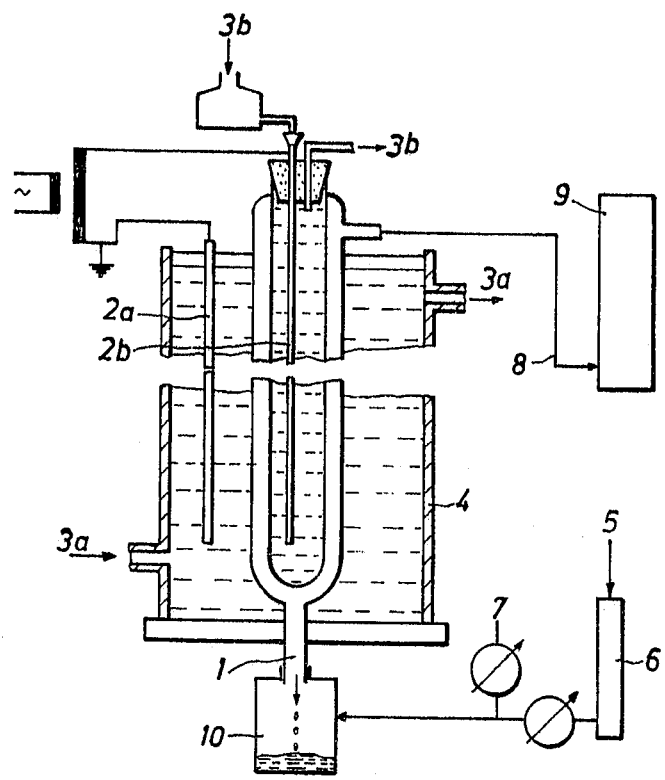

The invention will now be described more fully in conjunction with the accompanying drawings wherein:

FIG. 1 is a schematic illustration of an apparatus for carrying out the process; and FIG. 2 is a view showing the construction of the reactor of FIG. 1.

By way of illustration but not limitation, in FIG. 1 the reactor comprises two coaxial glass tubes 1. The high alternating voltage is applied to the outside wall of the outer tube and to the inside wall of the inner tube by means of metal lead-in conductors 2 and electrically conductive liquids 3. FIG. 2 shows a particular form of construction of the reactor. The coaxial tube arrangement 1 consists of normal glass 16/III of the firm Schott and Genossen, Mainz; it has a height of 600 mm., a mean diameter of 38 mm. an an annular clearance of 3 mm.; the wall thickness of the glass is 1.5 to 1.6 mm. The high alternating voltage is applied to the outside wall of the outer tube of the coaxial glass tube arrangement 1 through a solid copper bar 2a and water 3a which has been rendered sufficiently conductive, and to the inside wall of the inner tube through a copper tube 2b and water 3b which has been rendered sufficiently electrically conductive. Both the water 3a and the water 3b may be separately cooled to about −20° C., the normal freezing point being depressed by addition of salt or acid. The water 3a is situated in a plastic vessel 4. The gas stream 5, consisting of $O_2$ or $O_2$–$N_2$ or $N_2O$–$O_2$–$N_2$ mixtures, is passed through a drying device 6, mixed with the propylene stream 7 and passed through the reactor. The gaseous product stream 8 leaves the reactor and is analyzed in the gas chromatograph 9. The liquid products produced in the reaction travel downwardly out of the reactor and collect in a vessel 10.

The gaseous feed mixture, consisting of propylene and gas containing oxygen in free or combined form, flows through the annular space between the two coaxial glass tubes 1 in axial direction. A high alternating voltage is applied to the inside wall of the inner tube and to the outside wall of the outer tube. In the case of low alternating voltage, only a dielectric displacement current, i.e. a reactive current, flows through the reactor; the active electric power $N_{ir}$ is zero. In the equivalent circuit diagram, the arrangement consists of two series connected capacitances (capacitance $C_d$ of the glass dielectric, and capacitance $C_g$ of the gas between the two tubes) a spark gap being connected in parallel with the capacitance $C_g$. When a particular voltage is reached, i.e. the ignition voltage or the minimum operating voltage $V_b$, the capacitance $C_g$ is short circuited across this spark gap (in the equivalent circuit diagram). As the voltage increases, or when the charge on the walls of the capacitance $C_g$ exceeds a particular value, there is set up in the reactor a multiplicity of low-intensity, thin discharge filaments through the gas. This discharge differs from a conventional spark discharge between metallic electrodes substantially by the fact that, between metals, all the energy stored in the capacitor enters the discharge spark at a preferred point which is determined, for example, by point effect. A very high temperature is present in the spark. In the case of silent discharge, an impeded discharge takes place with a capacitive series resistance. The charge is located on insulators and is not displaceable. Each small surface element of the glass wall self-discharges through an extremely weak "-spark" (the aforesaid equivalent circuit diagram applies exactly only to the imaginary small unit cell of the discharge apparatus). As a result a very large number of very weak discharge flashes occur perpendicularly to the tube walls, i.e. in radial direction, throughout the annular clearance between the tube walls. The flashes take place continuously at other points. In a well-darkened room, the individual discharge "-needled" can be seen when the eyes have become adapted to the light conditions; they are so close together that the impression is first gained that there is a homogeneous discharge.

This discharge plasma is very far from thermal equilibrium, i.e. the electron temperature is very much higher, by several orders of magnitude, than the ion temperature and the gas temperature. The energy introduced into the electrical discharge is for the greater part utilized for the electronic excitation of the molecules and only to a small extent for dissociation and ionization. Therefore, the discharge has a very low light intensity and the gas remains substantially cold; the gas temperature is generally only slightly above ambient temperature and in any case it is below 200° C. under normal pressure. The plasma produced in these discharges is a nonequilibrium or cold plasma.

In the case of $C_3H_6$–$O_2$–$N_2$ gas mixtures, it has been found that, regardless of the gas pressure in the reactor, the largest absolute yields of propylene oxide are obtained if the propylene concentration in the gas mixture is below the lower explosive or ignition limit before the gas mixture enters the discharge reactor. The absolute maximum occurs in the immediate neighborhood of the lower explosion or ignition limit, which is about 2 percent of propylene by volume. In accordance with out invention, we have surprisingly found that both the absolute yield of product, related to the same total throughput of the gas mixtures concerned, and the energy yield of propylene oxide (grams per kilowatt hour) are clearly lower when operating above the upper explosive or ignition limit of the gas mixture than when operating below the lower limit.

In the case of $C_3H_6$–$N_2O$ mixtures, there is substantially no explosive range in silent discharge. The highest propylene oxide yields, related to throughput and to conversion, and the highest energy yields for propylene oxide are obtained with propylene concentrations ⩽10 percent in the mixture introduced.

As the oxygen-containing gas there is preferably employed oxygen or nitrous oxide. Alternatively, air and other oxygen-nitrogen mixtures of nitrous oxide-oxygen-nitrogen mixtures, preferably of relatively high oxygen content, may be employed. Small amounts of impurities in the oxygen-containing gas such as a few tenths of 1 percent generally have no effect on the propylene oxide yield. For example, a small moisture content in the gas mixture and small additions of carbon monoxide, carbon dioxide, formaldehyde, butane, butylene and many other simple hydrocarbons have no effect on the propylene oxide yield.

The gaseous mixture which enters the discharge reactor should in any case be carefully and homogeneously mixed.

The process of the invention can operate at any pressure in vacuo, under normal pressure or in the high-pressure range. However, when it is carried out in vacuo, the energy yield for propylene oxide is not higher than when it is carried out under normal pressure. Moreover, the maintenance of low pressure is costly. Moreover, the maintenance of low pressure is costly. Generally speaking, it is best to operate in a pressure range from about 0.5 to 10 atmospheres.

The mean residence time of the gas mixture in the discharge reactor with which optimum propylene oxide and energy yields for propylene oxide are obtained is from about 0.05 to 50 seconds, depending upon the discharge conditions, the geometry and the nature of the material of the reactor, the optimum mean residence time being generally from about 0.1 to 1 second. With mean residence times of about 10 seconds, the conversion of the propylene is approximately 100 percent. The selectivity of the reaction towards propylene oxide and the energy yield for propylene oxide, however, are generally higher with mean residence times of 0.1 to 1 second. The conversion generally decreases when the means residence time is shortened. With a mean residence time of 2 second, for example, it may amount to 50 percent depending upon the discharge conditions and upon the geometry of the reactor and the nature of the material of which it is constructed.

Since, with mean residence times of less than about 5 seconds, the gas leaving the reactor after a single passage therethrough still contains appreciable quantities of unreacted propylene, the waste gas may again be passed once through the reactor or circulated a number of times therethrough, after isolation of the propylene oxide and other readily isolated gases, above all the readily condensible reaction products. This is to be recommended especially if the oxygen-containing gas consists for the greater part of oxygen. Since the propylene concentration in the gas mixture is then less than about 2 percent by volume before it enters the reactor, the oxygen consumption is also relatively low, so that, for example, a gas mixture consisting of oxygen with about 1.9 percent by volume of propylene can be passed into the reactor, the freshly formed products can be substantially isolated beyond the reactor and oxygen and propylene may be admixed therewith in quantities equal to those consumed in one passage, and the gas mixture may be returned to the reactor. Small impurities due to reaction products are not harmful, as described in the foregoing. The performance of such a cyclic process is possible with the known means of chemical processing (isolation of the reaction products) and of measuring and automatic control techniques (automatic admixture of oxygen and propylene, maintenance of a constant rate of flow of the whole throughput and thus maintaining at a constant value the mean residence time, and maintaining a constant propylene concentration) and belongs to the prior art, so that it need not be further described here. The advantage of this method of gas circulation is obvious; it can be practiced without loss of unreacted propylene, and only as much oxygen is required as is necessary for the conversion of the propylene.

For carrying out the process of the invention, it is necessary for the plasma gas to be present in the form of a relatively thin layer, as seen in the direction of the alternating electrical field, between the walls to which the alternating voltage is applied. The thickness of this plasma layer, i.e. the width of this gap, is preferably from about 1 to 20 mm., and preferably less than about 10 mm. It is true that plasma layers of a thickness of less than 1 mm. are also possible in principle, but the construction of suitable reactors from glass or other insulators presents some difficulty. If the gap is too wide, correspondingly large distances are required between the walls to which the alternating voltage is applied, and this means that very high voltages are necessary for the ignition of the discharge, which it is desirable to avoid in chemical reactors unless particular advantages are obtained therefrom. With large distances between the walls, the plasma discharge tends to exhibit relatively great inhomogeneities, i.e. there are zones in which a very large number of weak discharge flashes occur, and zones in which only a few discharge flashes are set up. Such inhomogeneities cause a lowering of the extent of conversion and more particularly of the propylene oxide yield.

A discharge reactor suitable for carrying out the process of the invention may consist, for example of two coaxial tubes between which there is an annular clearance of about 1 to 10 mm. The diameter of the tubes is not critical and it is determined primarily on the basis of the optimum utilization of space. The length of the discharge reactor is not of decisive importance, but is is preferably of substantially about 1 meter. Instead of the inner coaxial tube, there may be employed a coaxially disposed bar or solid rod.

The two walls by which the plasma layer is bounded may be two electrical insulators, or one wall may be an electrical insulator and the other a metal or a semiconductor. There may be employed as insulators, for example, glass, quartz or ceramics (clay ceramics or special ceramics) based upon $SiO_2$, $Al_2O_3$, $ZrO_2$, $TiO_2$, $MgO$, $Si_3N_4$ or $BN$. Plastics may also be employed. Good results are also obtained in regard to the extent of the conversion, the propylene oxide yield and the energy yield for propylene oxide with a relatively low alternating high voltage, for example with the normal glass (also called thermometer glass) 16/III of Jenaer Glaswerk Schott and Genossen, Mainz.

This glass has a dielectric constant $\epsilon=7.3$ (according to the most recent measurements by Glaswerk Schott: at 1 mc. per second and 20° C.). Glasses having a high dielectric constant, e.g. $\epsilon>5$, are particularly suitable for the process according to the invention. The thickness of the insulating walls should be a few millimeters.

Where one of the walls is a conductor, i.e. a noninsulator, sometimes referred to as a semicorona discharge process, it may consist of any metal. Particularly suitable are metals which are coated with a semiconducting oxidic layer, for example aluminum, and particularly gastight anodized aluminum. Superrefined steels, for example V2A or V4A steel, are also suitable, as are carbon and graphite. In the case of "-seimcorona" discharges, the discharge current is generally somewhat higher than in the case of discharges between insulating walls. The material employed for either or both of the walls may also be a material which catalytically influences the propylene oxidation.

The high voltage may be applied to the insulating walls, for example, through a conducting liquid. In the case of reactors, comprising coaxially arranged insulating tubes, the high voltage may be applied to the outside wall of the outside tube and to the inside wall of the inside tube, for example, through water which has been rendered electrically conductive, the conducting water inside the inner tube having no contact with the conducting water outside the outer tube (FIG. 1). The water may be rendered conductive, for example, by adding thereto a few percent of concentrated sulfuric acid. It is unnecessary to reach the maximum conductivity of $H_2O$–$H_2SO_4$ solutions, for which about 30 percent by weight of $H_2SO_4$ is needed. About 1 to 2 percent of $H_2SO_4$ in the water is generally quite sufficient.

The application of voltage to the insulating walls through an electrically conducting liquid has the further advantage that the walls of the reactor can be maintained at constant and equal temperature by means of this liquid. For example, the liquid may be continuously pumped by a pump through a thermostat. Since at least one wall is at high-voltage potential (the other may be grounded) the liquid in contact with the wall in question is at high-voltage potential and must therefore only be circulated by means of a pump which is insulated from the driving motor in respect of the high voltage. The thermostat must likewise be electrically insulated.

The yield of propylene oxide and the energy yield for propylene oxide are generally better when the discharge chamber is cooled. The respective yields are substantially constant when the wall temperature of the reactor is from about −20° C. to +20° C. and they slowly decrease above about 20° C. Generally speaking, there is no advantage in operating above about 100° C.

The magnitude of the high voltage which is required for carrying out the process of the invention depends mainly upon the width of the clearance between the walls, upon the wall thicknesses of the two walls in the case of insulating walls, upon the dielectric constant of the insulating walls, upon the frequency of the voltage and upon the gas composition. With increasing width of the clearance and increasing wall thickness of the insulating walls, the high voltage required also increases. As the dielectric constant increases, the necessary high voltage decreases. With increasing frequency, the necessary high voltage becomes slightly lower. $C_3H_6$–$N_2O$ mixtures require a voltage about 10 percent higher than that required with $C_3H_6$–$O_2$ mixtures at the same discharge current. Taking into account the various possibilities of the geometrical arrangement of a reactor for carrying out the process of the invention, it then follows that the necessary high voltage is from about 1,000 to 30,000 volts.

This range for the necessary high voltage is independent of the frequency of the voltage. For practical reasons, the lower limit of the frequency will be about 50 or 60 cycles per second. The process of the invention can also be carried out at a lower frequency, but not at 0 frequency. Since 50 or 60 cycles per second energy constitutes the cheapest electrical energy, and only one transformer is required for generating a 50 or 60 cycles per second high voltage, particularly simple embodiments of the process of the invention are possible with this frequency, in which the propylene oxide yield and the energy yield still reach considerably values. As the frequency increases, the extend of conversion of propylene, the propylene oxide yield, the energy yield and the space-time yield also increase; this applies to the various optimized discharge conditions. Although the process also operates in the high-frequency and microwave ranges, the yields are low therein. The high-frequency discharges in gases of polyatomic molecules under normal pressure or at higher pressures lead to considerable gas heating, so that complete oxidation of the propylene to $CO_2$ and $H_2O$ or considerable cracking becomes increasingly probable. The frequency ranges which come into consideration for carrying out the process of the invention are the high-frequency range and the medium-frequency range, mainly from about 50 to 10,000 cycles per second.

The determination of the propylene oxide yield was carried out mainly on the basis of gas chromatography analyses of the gas or vapor mixture leaving the reactor.

For calculating the energy yield for propylene oxide, in addition to the product yield expressed in grams per hour, there is required the electrical energy converted in the discharge; this lead to a determination of the active electrical power $N_W$ in the discharge. The following applies:

$$N_W = \eta \cdot V_{eff} \cdot I_{ic}$$

In this formula, $\eta$ represents the power factor, $V_{eff}$ the root-mean-square value of the applied high alternating voltage and $I_{ic}$ the active current. Owing to the capacitance $C_d$ of the dielectric, there exists between the voltage and the current a phase difference amounting to almost $\pi/2$. While the voltage curve is sinusoidal, the current curve is highly distorted and has superimposed thereon a large number of current impulses of very short duration (order of magnitude 1 microsecond). The active current consists for the greater part of these short current impulses, which correspond to the previously mentioned weak discharge flashes. It is measured with a suitable thermal converter. The power factor is calculated in accordance with the theory of Yu. F. Filippov and Yu. M. Emel'yanov (Russian Journal of Physical Chemistry, Vol. 33, No. 8, Aug. 1959, pages 155 to 159). As Filippov and Emel'yanov have shown in the same work, there applies to silent discharges $\eta \simeq \eta'$, where $\eta'$ is defined as the quotient of the active power $N_W$ divided by the product of the peak value of the applied high alternating voltage and the algebraic mean value of the current. Since the expression for $\eta'$ is more convenient and agrees substantially with $\eta$ in the case of silent discharges, $\eta'$ was substituted for $\eta$ in the calculation of the active power. The following applies $$\eta^1 = \frac{V_b}{V_o}\left(1 - \frac{V_b \cdot C_g}{(V_o - V_b)C_d}\right)$$

$V_b$ = minimum operating voltage,
$V_o$ = peak value of the applied high alternating voltage,
$C_d$ = capacitance of the wall dielectric (for example the glass),
$C_g$ = capacitance of the gas between the walls, in the gap.

There applies $V_b$: $V_b = V_o^x (C_d/(C_d + C_g))$ where $V_o^x$ represents the peak value of the high alternating voltage at which the discharge commences. $V_o^x$ is preferably determined by plotting the active current-voltage curve and linearly extrapolating it to zero active current. There is thus first obtained $V^x$, from which $V_o^x$ is determined by multiplication by $\sqrt{2}$.

Generally speaking, the value for $\eta'$ is in the neighborhood of 0.5.

It has surprisingly been found that the energy yield for propylene oxide increases when a suitable ohmic resistance is introduced into the external circuit of the discharge reactor. The active current and the product yield for propylene oxide are thereby reduced, but the active current decreases more than the product yield, so that the energy yield increases. If the applied total voltage is constant, the voltage present at the reactor is lower to the extent of the voltage drop across the resistance. If the resistance is appropriately chosen, the energy yield is up to about 32 percent higher than if there is no resistance in the external circuit, even taking into account the energy loss at the ohmic resistance. The value of the ohmic resistances suitable for increasing the energy yield for propylene oxide depends mainly upon the frequency of the applied high alternating voltage, but also upon the geometry of the discharge reactor. As the frequency increases, the value of the suitable resistances decreases. For example, with an alternating voltage of 50 cycles per second, a considerable improvement of the energy yield for propylene oxide is possible with resistances of about 50,000 ohms to 500,000 ohms. At 1,000 cycles per second, resistances of 1,000 to 100,000 ohms are particularly suitable. By the introduction of a resistance into the circuit, the form and the duration of the current pulses of which the discharge current consists are varied.

If an inductive resistance is introduced into the external circuit of the discharge reactor, the active current, the propylene conversion and the propylene oxide yield are higher than if there is no resistance in the circuit. The increase in the active current, which was at first unexpected, has its origin in the partial compensation of the phase difference of about $\pi/2$ between voltage and current which is caused by the capacitance $C_d$ of the wall material of the discharge reactor, so that, despite the introduction of an inductive resistance, an increase in the active current occurs, which results in an increase in the extent of conversion and of the propylene oxide yield. As the inductance is increased, the active current and the propylene oxide yield also increase. If the inductance is too high, ignition difficulties arise. Suitable inductances for increasing the propylene oxide yield are between about 1 henry and 100 henrys, the lower inductances being particularly suitable at frequencies of the high alternating voltage in the neighborhood of a few thousand cycles per second and the higher inductances at 50 cycles per second. The increase in the propylene oxide yield which can be obtained in practice by introducing an inductance into the external circuit of the discharge reactor may be more than 50 percent, the energy yield falling by at most about 10 percent, as compared with the case where there is no resistance in the circuit. After optimization of all the discharge conditions, an increase in the energy yield may also occur with circuits including inductances.

In order to obtain high economy in a discharge or plasma process, both a high product yield and a high energy yield must be aimed at. Since the two yields are not independent of one another, a compromise must always be made between the two yields. This compromise depends substantially upon the costs of the starting products, of the end products and of the current and upon whether or not it is possible to circulate unreacted starting product, and also upon the cost of isolation of the desired end products. In the process according to the invention described here, it is readily possible to seek the economic optimum between product yield and energy yield by connecting in series or in parallel with one another suitable ohmic and inductive resistances, because the energy yield for propylene oxide is increased and the product yield lowered by suitable ohmic resistances, while the propylene oxide yield is increased and the energy yield either increased or only slightly lowered by suitable inductive resistances.

It has long been known that ozone can be produced from molecular oxygen in silent electric discharges. However, the oxidation of the propylene to propylene oxide in silent electric discharges according to the invention described here does not take place by an oxidation of the propylene be means of ozone. If, for example, only oxygen is passed through the discharge reactor, so that an oxygen-ozone mixture leaves the reactor, and propylene is directly supplied at the outlet of the reactor, then there are formed only traces of propylene oxide which can barely be detected by gas chromatography, while for example relatively large quantities of formaldehyde are produced in addition to other reaction products. For the production of appreciable quantities of propylene oxide from propylene, it is necessary for propylene and oxygen or nitrous oxide to flow through the discharge reactor.

Measurements of the emission spectrum of the oxygen-propylene discharge in the process of the invention, carried out by means of a grating spectrometer, have shown that there are present in the discharge electronically excited oxygen molecules in the two metastable singlet states $$^1\Delta_g \text{ and } ^1\Sigma_g^+$$

as well as oxygen atoms in the basic state $O(^3P)$ and in the electronically excited $O(^1D)$ state.

The process of the invention will be further explained with reference to the following illustrative examples.

EXAMPLE 1

In a discharge reactor according to FIG. 2, 14 experiments were carried out with different $O_2$–$N_2$–$C_3H_6$ mixtures referred to in table 1 (consecutive experiments Nos. 1 to 14), with a 50 cycle per second high voltage of 15,000 $V_{eff}$. The total gas throughput was substantially the same in each of the 14 experiments (about 100 liters per hour S.T.P.); the mean residence time of the gas mixture in the reactor was 8.1 seconds. The propylene oxide yield is indicated in relative units, i.e. in relative values of the propylene oxide concentration in the gas mixture leaving the reactor after having passed once therethrough.

In experiment 5 of example 1, the extent of conversion of the propylene was substantially 100 percent. The yields expressed in mole percent are indicated in table 2, which is a combination of the analyses of the gaseous and liquid reaction products present a few days after the reaction.

Table 2

Yields in percent of theoretical for experiment 5 of Example 1

| | |
|---|---|
| Propylene oxide | 15.8% |
| Isopropoxy groups (mainly acetic acid isopropyl ester) | 18.4 |
| Formic acid | 12.1 |
| Acetaldehyde | 10.3 |
| Metaldehyde | 7.1 |
| Carbon monoxide | 6.0 |
| Formaldehyde | 5.9 |
| Formic acid methyl ester | 3.8 |
| Acetic acid | 2.2 |
| Acetone | 1.5 |
| Propionaldehyde | about 1 |
| Carbon dioxide | about 0.5 |
| Lea12437-A | |
| Glycollic acid | about 0.5% |
| Propionic acid | about 0.5 |
| Diacetyl | about 0.5 |
| | 86.1% |

The active current measured with a thermal converter was 9.9 milliamperes; the power factor according to the formula indicated in the text was found to be $\eta'=0.41$. The active power $N_W$ was consequently $N_W=61$ watts. The energy yield can be calculated therefrom with the particulars of table 2; it is found to be 11.4 grams of propylene oxide per kilowatt hour.

Example 2

A mixture of 900 liters $O_2$ and 17.0 liters of $C_3H_6$ calculated at S.T.P., was passed hourly through the discharge reactor according to FIG. 2 with an applied high voltage of 15,000 $V_{eff}$ of 50 cycles per second. The gas mixture was not passed over a drying agent as in example 1. The water inside the inner tube and the water outside the outer tube were rendered conductive with about 4 percent of concentrated sulfuric acid. The mean residence time of the gas mixture in the reactor was 0.9

TABLE 1.—PROPYLENE OXIDE YIELD OF EXPERIMENTS 1 TO 14 OF EXAMPLE 1

| Number | $O_2$ | | $N_2$ | | Propylene | | Propylene oxide yield, relative units |
|---|---|---|---|---|---|---|---|
| | L./h., S.T.P. | Vol., percent | L./h., S.T.P. | Vol., percent | L./h., S.T.P. | Vol., percent | |
| 1 | 100 | 98.4 | | | 1.7 | 1.6 | 98 |
| 2 | 90 | 88.6 | 10 | 9.8 | 1.7 | 1.6 | 94.5 |
| 3 | 80 | 78.7 | 20 | 19.7 | 1.7 | 1.6 | 96 |
| 4 | 75 | 73.8 | 25 | 24.6 | 1.7 | 1.6 | 96 |
| 5 | 70 | 68.8 | 30 | 29.6 | 1.7 | 1.6 | 98.5 |
| 6 | 65 | 63.9 | 35 | 34.5 | 1.7 | 1.6 | 97.5 |
| 7 | 60 | 59.0 | 40 | 39.4 | 1.7 | 1.6 | 96 |
| 8 | 40 | 39.4 | 60 | 59.0 | 1.7 | 1.6 | 84.5 |
| 9 | 20 | 19.7 | 80 | 78.7 | 1.7 | 1.6 | 54 |
| 10 | 15 | 15.0 | 70 | 70.0 | 15.0 | 15.0 | 19.5 |
| 11 | 20 | 20.0 | 55 | 55.0 | 25.0 | 25.0 | 20 |
| 12 | 30 | 30.0 | 35 | 35.0 | 35.0 | 35.0 | 30 |
| 13 | 35 | 35.0 | 20 | 20.0 | 45.0 | 45.0 | 34 |
| 14 | 40 | 40.0 | | | 60.0 | 60.0 | 41.5 | seconds, and 39 percent of the propylene passed into the discharge reactor was converted, 24.3 percent thereof into propylene oxide. The active current measured by means of a thermal converter was 18.0 milliamperes and the power factor was $\eta'=0.41$ as in example 1; this shows an active power of $N_W=110$ watts. The calculated energy yield is accordingly 37.9 grams of propylene oxide per kilowatt hour.

When a resistance of 150,000 ohms was introduced into the outer circuit of the discharge reactor without any change in the remaining adjustable conditions, the conversion of propylene and the propylene oxide yield fell, to 34 percent and to 22.6 percent respectively, but the active current also fell to 11.7 milliamperes. With a power factor $\eta'=0.41$, there is obtained, taking into consideration the power consumption of the 150,000 ohm resistance, an active power $N_W=7.8$ watts. The energy yield is found by calculation to be 47.2 grams of propylene oxide per kilowatt hour, and it thus rose by 24.5 percent in relation to the circuit having no resistance.

Example 3

In a discharge reactor of similar construction to that sketched in FIG. 2, also consisting of two coaxial tubes of Schott normal glass 16/III of substantially equal dimensions, the production of propylene oxide was carried out in a 1,000 cycles per second high-voltage discharge. A voltage of 220 volts at 1,000 cycles per second was generated from 220 volts at 50 cycles per second by means of a rotation frequency converter. This voltage was applied through a regulation transformer to a high-voltage transformer designed for 1,000 cycles per second. The high voltage was again applied through an aqueous 4% $H_2SO_4$ solution to the outside wall of the outer tube and to the inside wall of the inner tube of the coaxial tube arrangement. A mixture of 700 liters per hour of $O_2$ and 13.0 liters per hour of $C_3H_6$ calculated at S.T.P. was introduced into the reactor. The applied 1,000 cycles per second high voltage amounted to 4,265 $V_{eff}$. Forty-eight percent of the propylene was converted after one pass through the reactor. The propylene oxide yield was 36.4 percent. The power factor was calculated as $\eta'=0.468$. With a thermoconverter, an active current of 48.8 milliamperes was measured. The active power amounted to 120.5 watts. Consequently, the energy yield was 48.5 grams of propylene oxide per kilowatt hour.

When a resistance of 20,000 ohms was introduced into the external circuit of the discharge reactor under otherwise unchanged conditions, the conversion, the propylene oxide yield and the active current were reduced. The conversion amounted to 41 percent and the propylene oxide yield was 29 percent. The active current fell to 25.2 milliamperes. With an unchanged power factor, this gives an active power of 62.1 watts (power consumption at the 20,000 ohms resistance is taken into account) and an energy yield of 64.3 grams of propylene oxide per kilowatt hour, i.e. an increase in the energy yield of 32.6 percent in relation to the case where no resistance is employed.

Example 4

A discharge reactor was employed which had the same geometrical form as the reactor in example 3, except that the coaxial arrangement consisted of Pyrex glass. The cooling and voltage supply was the same as in example 3. Per hour there was passed through the reactor a mixture of 900 liters of $O_2$ and 17.0 liters of $C_3H_6$ (calculated at S.T.P.). The applied voltage was 8,100 $V_{eff}$. A resistance of 3,000 ohms was present in the external circuit of the discharge reactor. Forty-seven percent of propylene was converted. The propylene oxide yield was 31.5 percent. The power factor amounted to 0.316; the active power measured was 32.3 milliamperes. This gave an active power of 108 watts and an energy yield of 60.4 grams of propylene oxide per killowatt hour (the power consumption at the 3,000 ohms resistance is taken into account).

When a coil having a resistance of 1,570 ohms and an inductance of 4.25 henrys was additionally introduced into the external circuit in series with the 3,000 ohms resistance, under otherwise unchanged conditions, the propylene oxide yield and the active current were increased.

With a conversion of 48 percent, the propylene oxide yield was 34.4 percent. The active current amounted to 45.0 milliamperes. The active power was calculated as 114.8 watts. Consequently, the energy yield was 63.3 grams of propylene oxide per kilowatt hour.

When an iron core consisting of laminated stampings was introduced into the coil, whereby the inductance was raised to 27.36 henrys, and the applied high voltage was lowered to 5,850 $V_{eff}$, all other conditions remaining constant, the conversion, the propylene oxide yield and the active current further increased. Fifty-one percent of propylene was converted; the propylene oxide yield amounted to 44.9 percent; the active current rose to 56.3 milliamperes. The power factor was determined as 0.305. The active power consequently amounted to 104 watts. Therefore, the energy yield was 96.9 grams of propylene oxide per kilowatt hour. In this case, therefore, the product yield and the energy yield for propylene oxide rose simultaneously.

Example 5

A coaxial-tube reactor consisting of Schott normal glass 16/III of a thickness of 1.6 mm. and having an axial length of 40 cm., a clearance of 10 mm. between the two coaxial glass tubes and a mean diameter of 50 mm. was employed. A 1,000 cycles per second voltage of 13,050 $V_{eff}$ was applied to the outside wall of the outer tube and to the inside wall of the inner tube through a substantially 4% aqueous $H_2SO_4$ solution. There flowed through the reactor a mixture of 2,000 liters of $O_2$ and 37 liters of $C_3H_6$ per hour, calculated at S.T.P. There was present in the circuit of the reactor a choke having a resistance of 870 ohms and an inductance of 52 henrys. Fifty percent of propylene were converted. The propylene oxide yield amounted to 49.2 percent. The power factor was determined as 0.58. An active current of 52.3 milliamperes was measured with a thermal converter. There is calculated therefrom an active power of 396 watts and an energy yield of 59.5 grams propylene oxide per kilowatt hour.

Example 6

A discharge reactor as in example 4 was employed (height 60 cm., clearance 3 mm., Pyrex glass). A 1,000 cycles per second high voltage of 7,425 $V_{eff}$ was applied as in the earlier examples. There was present in the external circuit a choke having a resistance of 950 ohms and an inductance of 60 henrys. The conductive water was not cooled and the gases were not dried. A mixture of 3,600 liters of $O_2$ and 70 liters of $C_3H_6$ per hour calculated at S.T.P., was passed through the reactor.

The active current was 63.5 milliamperes; the power factor was found to be $\eta'=0.31$. The residence time of the gas mixture in the discharge reactor was about 0.2 seconds. The gas temperature measured at the output of the reactor was 95° C. 24.9 percent of the propylene was converted. The yields calculated on the extent of conversion were:

37.5% of propylene oxide
26.3% of propionaldehyde
9.1% of acetaldehyde
8.4% of carbon monoxide
4.3% of carbon dioxide A crystal-clear liquid reaction product was formed on the walls of the reactor, this product consisting of about 20 percent by weight of peroxide immediately after completion of a 3-hour experiment. The energy yield for propylene oxide was 108 grams per kilowatt hour.

Example 7

A discharge reactor as in example 4 was employed (height 68 cm., clearance 3 mm., Pyrex glass).

A 1,000 cycles per second high voltage of 9,225 $V_{eff}$ was applied as in the earlier examples. There was present in the outer circuit a choke having a resistance of 950 ohms and an inductance of 40 henrys. There was no cooling of the conductive water and no gas drying. A mixture of 2,700 liters of $N_2O$ and 200 liters of $C_3H_6$ per hour, calculated at S.T.P., was passed through the reactor. The active current was 59 milliamperes and the power factor 0.42. The gas temperature at the outlet of the reactor was 125° C. About 5% of $N_2O$ was decomposed, and 16.7% of propylene was converted. The following yields related to the conversion were obtained:

35.2% of propylene oxide
29.5% of propionaldehyde
Traces:
    acetaldehyde
    carbon monoxide
    carbon dioxide
    acrolein
    acetone A liquid reaction product of yellowish-brown color was formed on the inside walls of the reactor. The energy yield for propylene oxide was 144 grams per kilowatt hour.

Example 8

The same procedure was adopted as in example 7 except for the following differences: the hourly flow of gases to the reactor comprised a mixture of 1,800 liters of $O_2$, 150 liters of $N_2O$ and 36 liters of $C_3H_6$, calculated at S.T.P. The 1,000 cycles per second high voltage was 7,100 $V_{eff}$. The active current was 57 milliamperes. The power factor was 0.36 and the gas temperature at the outlet 78° C. The propylene conversion was 54.4 percent Yields calculated on the conversion:

38.0% of propylene oxide
33.2% of propionaldehyde
5.7% of acetaldehyde
3.1% of acrolein
3.0% of carbon monoxide
1.0% of carbon dioxide
trace: acetone The energy yield for propylene oxide was 132 grams per kilowatt hour.

It will be appreciated that the instant specification and examples are set forth by way of illustration and not limitation, and that various modifications and changes may be made without departing from the spirit and scope of the present invention.

What we claim is:

1. Process for the direct oxidation of propylene to propylene-1,2-oxide in which a gaseous mixture of propylene together with a gas selected from the group consisting of air, oxygen, nitrous oxide and mixtures thereof wherein the concentration of propylene in the gaseous mixture is below the explosive limit is continuously fed to an electric alternating current gas discharge which is of such nature that the electrical alternating field is applied perpendicularly to the direction of flow of the gas mixture; in which the gas discharge is electrically in series with a dielectric of high dielectric constant and comes into contact with the gas discharge plasma of this dielectric at least on one side, as seen in the direction of the electric field; and in which the gas mixture containing propylene-1,2-oxide continuously leaves the discharge chamber.

2. The process according to claim 1, wherein the pressure of said gaseous mixture in said discharge reactor ranges from about 0.5 to 10 atmospheres.

3. The process according to claim 1, wherein the frequency of said alternating electric field ranges from about 50 to 10,000 cycles per second.

4. The process according to claim 1, wherein the temperature of said gaseous mixture in said discharge reactor ranges from about room temperature up to about 200° C.

5. The process according to claim 1, wherein the mean residence time of said gaseous mixture in said discharge reactor ranges from about 0.05 to 50 seconds.

6. The process according to claim 1, wherein the width of the gap in said discharge reactor in the direction of the alternating electric field ranges from about 0.5 to 20 mm.

7. The process according to claim 1, wherein the material of high dielectric constant is glass or a ceramic.

8. The process according to claim 1, wherein the root mean square value of the applied voltage ranges from about 1,000 to 30,000 volts.

9. The process according to claim 1, wherein there is included in said circuit outside said discharge reactor an ohmic resistance, whereby the yield of propylene oxide per kilowatt hour of expended energy is increased.

10. The process according to claim 9, wherein the frequency of said alternating voltage is in the neighborhood of about 50 cycles per second and the resistance ranges from about 50,000 to 500,000 ohms.

11. The process according to claim 1, wherein there is included in said circuit outside said discharge reactor an inductance, whereby the yield of propylene oxide and the yield of propylene oxide per kilowatt hour of expended energy are both increased.

12. The process according to claim 11, wherein the frequency of said alternating voltage is about 50 cycles per second and the inductance ranges from about 10 to 100 henrys.

13. The process according to claim 1, wherein said gap comprises the annular space between a pair of coaxial tubes at least one of which on its face directed toward the other tube comprises a material of high dielectric constant.

14. The process according to claim 1, wherein the gaseous mixture withdrawn from said gap is treated to remove therefrom products formed in said discharge reactor and the residual gaseous mixture is recycled to said discharge reactor along with makeup propylene and oxygen-containing gas.

* * * * *

UNITED STATES PATENT OFFICE
CERTIFICATE OF CORRECTION

Patent No. 3625847              Dated December 7, 1971

Inventor(s) Roland Weisbeck

It is certified that error appears in the above-identified patent and that said Letters Patent are hereby corrected as shown below:

Col. 1, line 59

"an" (first occurrence) should be --and--

Col. 2, line 61

"out" should be --our--

Col. 3, line 17 delete "Moreover, the maintenance of low pressure is costly."

Col. 3, line 33

"means" should be --mean-- line 34

"2" should be --1--

Col. 4, line 30

Lettering of "$TiO_2$" should be same size and placement as "$ZrO_2$" and other symbols.

Col. 5, line 9

"=20°C" should be -- -20°C --

PO-1050
(5/69)

UNITED STATES PATENT OFFICE
CERTIFICATE OF CORRECTION

Patent No. 3625847            Dated December 7, 1971

Inventor(s) Roland Weisbeck

It is certified that error appears in the above-identified patent and that said Letters Patent are hereby corrected as shown below:

Col. 5, line 40

"considerably" should be --considerable--

Col. 5, line 41

"extend" should be --extent--

Col. 6, line 40

"32" should be --33--

Col. 8, line 35

Delete "Lea 12437-A"

Col. 11, line 11

"29.5%" should be --29.4%--

Signed and sealed this 20th day of June 1972.

(SEAL)
Attest:

EDWARD M. FLETCHER, JR.        ROBERT GOTTSCHALK
Attesting Officer                Commissioner of Patents